US012681494B2

(12) United States Patent
Deng et al.

(10) Patent No.: US 12,681,494 B2
(45) Date of Patent: Jul. 14, 2026

(54) CHARACTERISTIC ESTIMATION OF A VEHICLE USING IMAGING DATA

(71) Applicant: Toyota Motor Engineering & Manufacturing North America, Inc., Plano, TX (US)

(72) Inventors: Xintong Deng, Plymouth, MI (US); Yufei Zhu, Ypsilanti, MI (US); Taro Tsukada, Nagaizumi (JP)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 96 days.

(21) Appl. No.: 18/626,518

(22) Filed: Apr. 4, 2024

(65) Prior Publication Data

US 2025/0315056 A1      Oct. 9, 2025

(51) Int. Cl.
| | |
|---|---|
| *G05D 1/49* | (2024.01) |
| *G05D 109/20* | (2024.01) |
| *G05D 111/10* | (2024.01) |
| *G06V 10/762* | (2022.01) |
| *G06V 20/17* | (2022.01) |

(52) U.S. Cl.
CPC ............. *G05D 1/49* (2024.01); *G06V 10/762* (2022.01); *G06V 20/17* (2022.01); *G05D 2109/20* (2024.01); *G05D 2111/14* (2024.01)

(58) Field of Classification Search
CPC .. G05D 1/49; G05D 2109/20; G05D 2111/14; G06V 10/762; G06V 20/17
See application file for complete search history.

(56) References Cited

U.S. PATENT DOCUMENTS

| | | | | |
|---|---|---|---|---|
| 2020/0143549 A1* | 5/2020 | Weng | ...................... | G06T 7/155 |
| 2024/0428696 A1* | 12/2024 | Shoeb | ...................... | G08G 5/57 |

FOREIGN PATENT DOCUMENTS

| | | | | | |
|---|---|---|---|---|---|
| CN | 105678230 A | * | 6/2016 | ........... | G06V 10/752 |
| CN | 111739050 A | * | 10/2020 | ........... | G06F 9/5027 |

OTHER PUBLICATIONS

EPO machine translated description of CN-111739050-A. (Year: 2020).*
EPO machine translated description of CN-105678230-A. (Year: 2015).*
P. Gakne et al., "Tightly-Coupled GNSS/Vision Using a Sky-Pointing Camera for Vehicle Navigation in Urban Areas", Sensors, MDPI, Apr. 17, 2018, 32 pages.
Anders Strand, "Aided Remote Control of Indoor UAV", Master's Thesis, Dept. of Engineering Cybernetics, Norwegian University of Science and Technology, Trondheim, Norway, Jun. 2015, 23 pages.
P. Moreno, "Deep Earth Drones", Thesis, Aerial Robotics Lab, Imperial College London, Jun. 18, 2018, 23 pages.

* cited by examiner

*Primary Examiner* — Navid Z. Mehdizadeh
*Assistant Examiner* — Shelley Marie Osterhout
(74) *Attorney, Agent, or Firm* — Jordan IP Law, LLC

(57) ABSTRACT

A computing system may include a processor. The computing system may include a memory having a set of instructions, which when executed by the processor, cause the computing system to obtain, from an imaging sensor, an image, determine isothermal lines on the image, and determine a characteristic of a vehicle based on centroids of the isothermal lines.

17 Claims, 9 Drawing Sheets

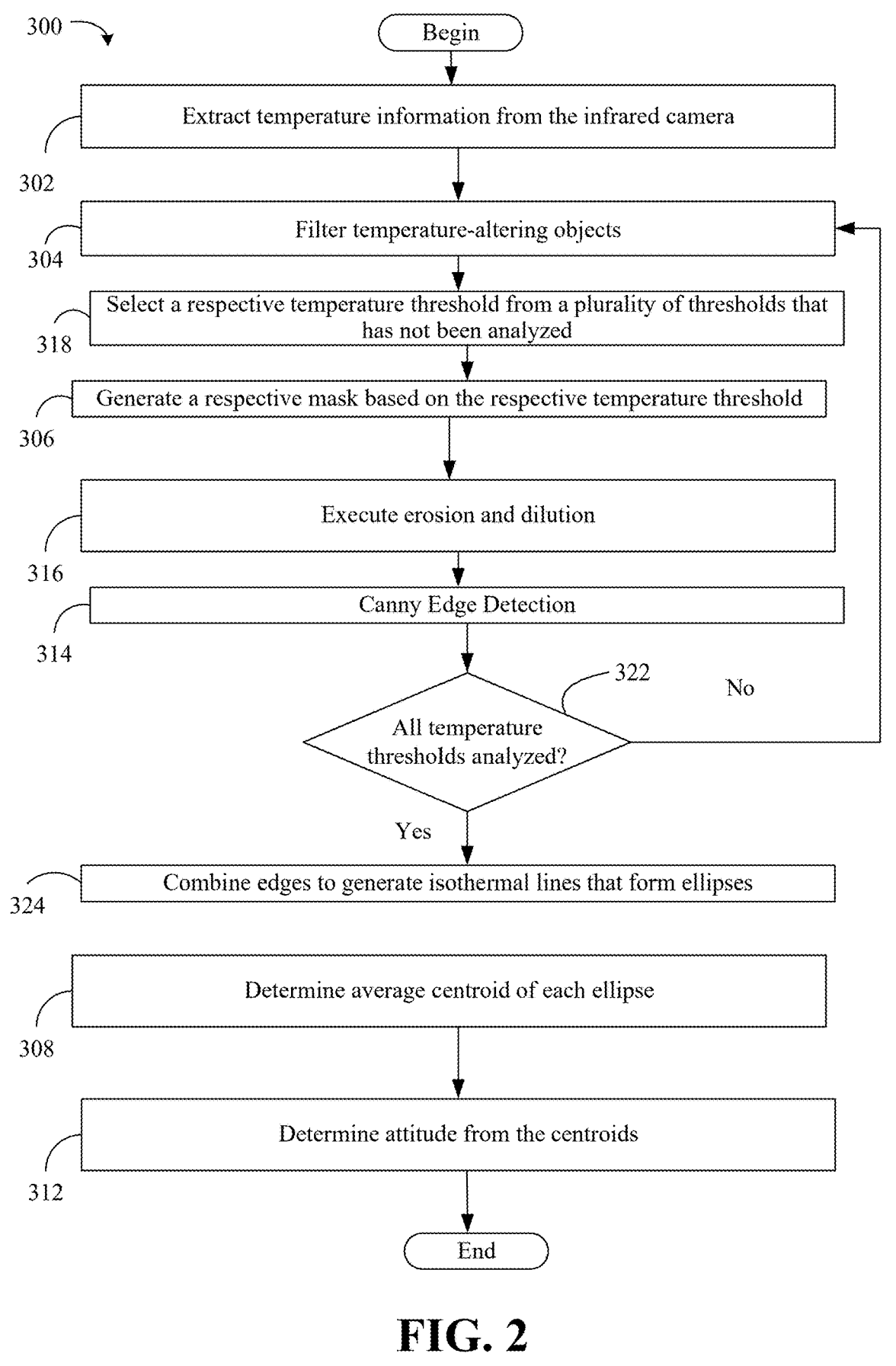

300

Begin

Extract temperature information from the infrared camera

302

Filter temperature-altering objects

304

Select a respective temperature threshold from a plurality of thresholds that has not been analyzed

318

Generate a respective mask based on the respective temperature threshold

306

Execute erosion and dilution

316

Canny Edge Detection

314

322

No

All temperature thresholds analyzed?

Yes

Combine edges to generate isothermal lines that form ellipses

324

Determine average centroid of each ellipse

308

Determine attitude from the centroids

312

End

FIG. 2

CHARACTERISTIC ESTIMATION OF A VEHICLE USING IMAGING DATA

TECHNICAL FIELD

Examples generally relate to determining a characteristic of a vehicle based on imaging data from an imaging sensor of the vehicle. In detail, examples determine isothermal lines based on the image, and determine a characteristic of the vehicle based on the isothermal lines.

BACKGROUND

Recently, there has been a significant increase in the use of machines (e.g., vehicles and/or drones) to carry out different tasks in various settings. For example, unmanned aerial vehicles (e.g., drones) may perform functions including photography, filming, delivering goods, transporting humans, etc. Some robots and/or vehicles may be used in manufacturing centers, warehouses, restaurants, etc. Airborne wind-energy may include unpowered aircrafts, such as kites, that are controlled to generate electricity. In such scenarios, machines may seek to safely navigate in a dynamic and changing environment.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In some aspects, the techniques described herein relate to a control system including a processor, and a memory having a set of instructions, which when executed by the processor, cause the control system to obtain, from an imaging sensor, an image, determine isothermal lines on the image, and determine a characteristic of a vehicle based on centroids of the isothermal lines.

In some aspects, the techniques described herein relate to at least one computer readable storage medium including a set of instructions, which when executed by a computing device, cause the computing device to obtain, from an imaging sensor, an image determine isothermal lines on the image, and determine a characteristic of a vehicle based on centroids of the isothermal lines.

In some aspects, the techniques described herein relate to a machine including an imaging sensor that obtains an image, a processor, and a memory having a set of instructions, which when executed by the processor, cause the machine to determine isothermal lines on the image, and determine a characteristic of the machine based on centroids of the isothermal lines.

BRIEF DESCRIPTION OF THE SEVERAL VIEWS OF THE DRAWINGS

The various advantages of the embodiments of the present disclosure will become apparent to one skilled in the art by reading the following specification and appended claims, and by referencing the following drawings, in which:

FIG. 2 shows a method of filtering process according to an example;

DETAILED DESCRIPTION

Figure 1A:
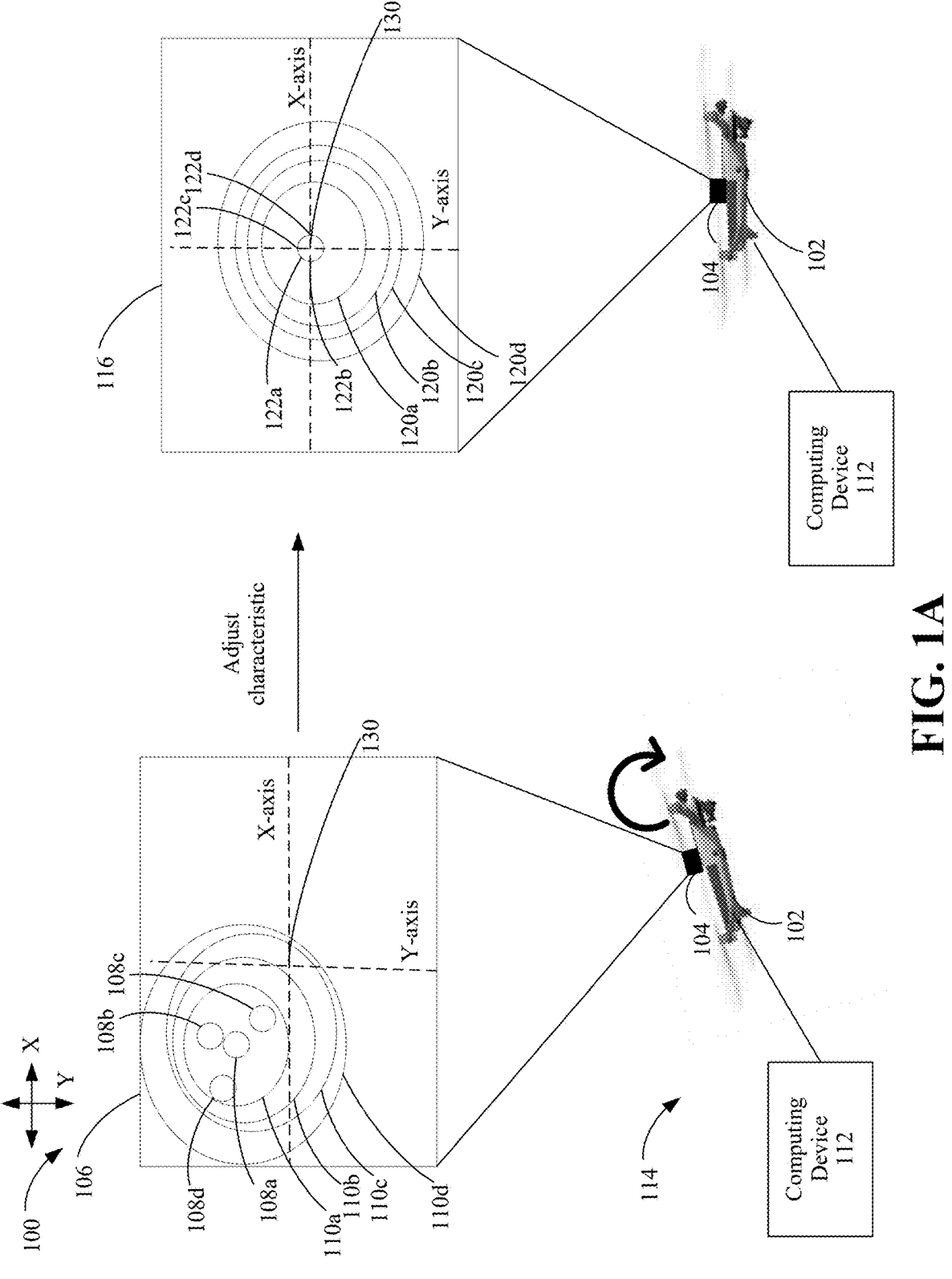
FIG. 1A is a diagram of a characteristic identification and machine adjustment process according to an example.

Navigation and operational processes of a machine (e.g., vehicles, robots, drones, etc.) may include determining a characteristic (e.g., attitude) of the machine. For example, orienting an aircraft within certain boundaries may enhance the operational efficiency and control of the aircraft, and further reduce risks of the aircraft. That is, control of the aircraft may be maintained based on the attitude of the aircraft. For example, suppose that the attitude of the aircraft is incorrectly estimated, the operational efficiency of the aircraft may be reduced and/or the aircraft may be placed into a dangerous situation (e.g., potentially crash). Other vehicles (e.g., construction equipment, automobiles, trucks, other motor vehicles, etc.) and/or robots (e.g., underwater drone and/or other types of drones) may also execute operations based on similar such characteristics.

Existing technology may access a red, green and blue (RGB) camera to identify a visual marker (e.g., horizon), or access another odometry method to estimate characteristics of the vehicle, such as attitude, orientation and/or position. Using RGB cameras results in poor performance in low light environments and may lead to inaccurate estimations of characteristics such as pitch, roll, and/or position.

Other existing technology may include inertial measurement units (IMUs). An IMU may be composed of several accelerometers, gyroscopes, and/or magnetometers. The IMU may estimate and report specific dynamic states such as angular velocity and accelerations, which may be used to determine attitude angles (roll and pitch), or velocity and position increments. IMUs may be prone to failure, particularly due to electromagnetic interference and therefore are unreliable under certain conditions. Further, erroneous IMU data may be observed after impacts to the vehicle. Moreover, IMUs may drift after prolonged flight time resulting in inaccurate data.

Therefore, existing technology fails to provide a reliable process to consistently ascertain characteristics of a vehicle, and particularly the attitude of the vehicle. Thus, existing technology may be considered unreliable in terms of determining the characteristics. Examples herein enhance the existing technology by incorporating a vision-based process that produces accurate results in various lighting conditions, including low levels of illumination (e.g., nighttime). The enhanced process described herein may operate in any level of illumination. Examples herein may include an infrared (IR) imaging sensor that obtains an image. To do so, examples obtain, from an imaging sensor, an image, determine isothermal lines on the image, and determine a characteristic of a machine (e.g., vehicle) based on the isothermal lines. Each of the isothermal lines correspond to a different temperature. That is, each of the isothermal lines are placed over areas with a particular temperature to illustrate the positioning of the temperature on the image.

IR imaging may be incorporated into examples for several reasons. For example, IR imaging may be effective and accurate during daytime and nighttime. Furthermore, IR imaging is cost effective. IR imaging sensors may capture IR radiation (e.g., a form of electromagnetic radiation) that has wavelengths ranging from 760 nanometers (nm) to 100,000 nm. Examples may be incorporated in various machines (e.g., vehicles, robots, airplanes, satellites, water, air drones, water drones, etc.) to facilitate navigation, steering, etc.

Figure 1B:
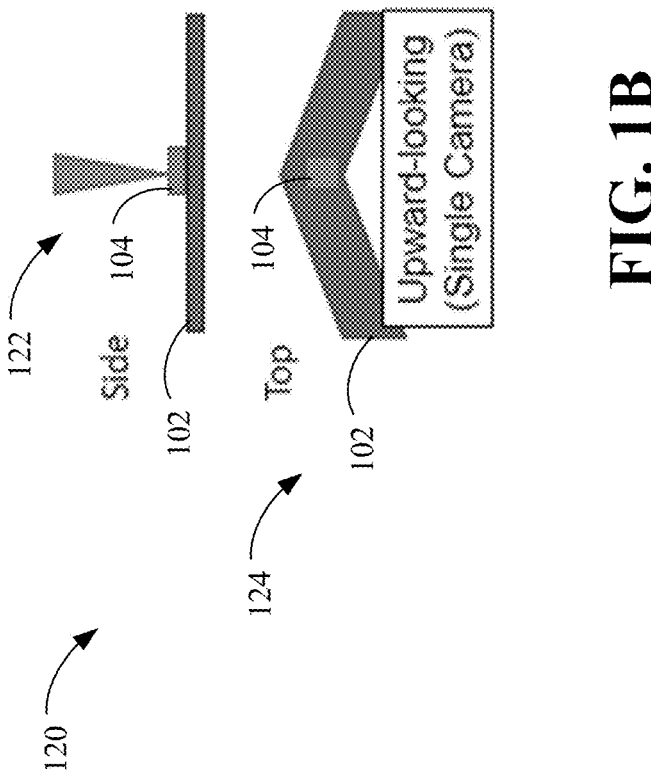
FIG. 1B is a diagram of a close-up perspective of the autonomous drone according to an example.

Turning now to FIGS. 1A-1B, a characteristic identification and machine adjustment process 100 is illustrated. In this example, the machine is an autonomous drone 102, but it will be understood that other machines, such as aircrafts, robots, and vehicles may be readily substituted for the autonomous drone 102.

The autonomous drone 102 includes an imaging sensor 104. The imaging sensor 104 may be an infrared camera. The imaging sensor 104 may connect with a computing device 112 (e.g., wired, and/or wireless signals such as Bluetooth, radio, etc.) that controls some actions of the autonomous drone 102. In some examples, the computing device 112 may be omitted, and instead the autonomous drone 102 includes hardware (e.g., microcontroller) that enables the autonomous drone 102 to operate autonomously (e.g., an edge drone). The autonomous drone 102 and the computing device 112 may be referred to as a machine system 114. In some examples, the machine system 114 may include only the autonomous drone 102 when the autonomous drone 102 is an edge drone. Depending on the implementation, the computing device 112 and/or the autonomous drone 102 may include a control system that comprises a processor, and a memory having a set of instructions, which when executed by the processor, cause the control system to implement aspects as described herein.

The machine system 114 implements a vision-based algorithm to identify characteristics (e.g., position, roll, pitch, orientation, etc.) of the autonomous drone 102. The imaging sensor 104 may accurately accommodate various illumination levels, including low-light condition during night operation.

In this example, the imaging sensor 104 is an infrared sensor and has an upward facing posture on the autonomous drone 102 (e.g., is on a top portion of the autonomous drone 102 when the autonomous drone 102 is flying level and straight). The imaging sensor 104 obtains IR images of an overhead portion of the imaging sensor 104. In this example, the overhead portion is the sky. To determine the characteristics of the autonomous drone 102, an first image 106 captured by the imaging sensor 104 is analyzed. The first image 106 may capture and represent IR conditions in the sky. The computing device 112 may receive the first image 106 and analyze the first image 106 as indicated below.

IR levels may increase with increasing temperature. That is, IR levels correspond to temperature. Therefore, the computing device 112 may determine temperatures represented in the first image 106 based on IR levels that are present in the first image 106. For example, portions of the first image 106 with greater levels of IR correspond to higher temperatures, while portions of the first image 106 with lower levels of IR correspond to lower temperatures.

The computing device 112 may then mask different temperature ranges and/or temperatures. For example, the computing device 112 may generate first-fourth isothermal lines 110a-110d (e.g., boundaries) between different temperature ranges that are identified.

For example, first isothermal line 110a may be mapped to portions of the first image 106 that only have a temperature of 240 Kelvin (K). That is, parts of the first image 106 that have a first amount of IR are marked with the first isothermal line 110a. Thus, the first isothermal line 110a may illustrate only the positions of the first image 106 that have a temperature of 240 K. Therefore, the temperature range in the area within the first isothermal line 110a may be less than 240 K. In some examples, the first isothermal line 110a may mark a range of temperatures.

The second isothermal line 110b may be mapped to portions of the first image 106 that only have a temperature of 250 K. That is, parts of the first image 106 that have a second amount of IR are marked with the second isothermal line 110b. Thus, the second isothermal line 110b may illustrate only the positions of the first image 106 that have a temperature of 250 K. Therefore, the temperature range in an area outside the first isothermal line 110a and up to the second isothermal line 110b may be 241 K-249 K. In some examples, the second isothermal line 110b may mark a range of temperatures.

The third isothermal line 110c may be mapped to portions of the first image 106 that only have a temperature of 260 K. That is, parts of the first image 106 that have a third amount of IR are marked with the third isothermal line 110c. Thus, the third isothermal line 110c may illustrate only the positions of the first image 106 that have a temperature of 260 K. The temperature range in an area outside the second isothermal line 110b and up to the third isothermal line 110c may be 251 k-259. In some examples, the third isothermal line 110c may mark a range of temperatures.

The fourth isothermal line 110d may be mapped to portions of the first image 106 that only have a temperature of 270 K. That is, parts of the first image 106 that have a fourth amount of IR are marked with the fourth isothermal line 110d. Thus, the fourth isothermal line 110d may illustrate only the positions of the first image 106 that have a temperature of 270 K. The temperature range in an area outside the third isothermal line 110c and up to the fourth isothermal line 110d may be 261 k-269 k.

The computing device 112 may filter temperature-altering objects with exclusion masks to exclude particular objects from the analysis of the first image 106, and in the above analysis. For example, the sun may skew results and is therefore masked. Similarly, other objects (e.g., birds, other aircrafts, skydivers, clouds, etc.) that alter the sky temperatures are masked in first image 106 and are not considered during the generation of the first-fourth isothermal lines 110a-110d. The temperature-altering objects will be masked out (e.g., an image mask will be created to remove the temperature-altering object) from the image.

The computing device 112 determines first-fourth centroids 108a-108d of the first-fourth isothermal lines 110a-110d. For example, the first-fourth isothermal lines 110a-110d form shapes, and the shapes have centroids that include the first-fourth centroids 108a-108d. The first-fourth centroids 108a-108d may be centers of the first-fourth boundaries 108a-108d and may be average centroids. The first centroid 108a may be the center of the first isothermal line 110a. The second centroid 108b may be the center of the second isothermal line 110b. The third centroid 108c may be the center of the third isothermal line 110c. The fourth centroid 108d may be the center of the fourth isothermal line 110d.

The computing device 112 may determine the characteristics of the autonomous drone 102 based on the first-fourth centroids 108a-108d. For example, the distance between the first-fourth centroids 108-108d may indicate the attitude of the autonomous drone 102. In some examples, the distance of the first-fourth centroids 108a-108d from a particular marker may indicate the characteristics of the autonomous drone 102. In some examples, the positions of the first-fourth centroids 108a-108d are averaged to generate an average centroid location. The average centroid location may indicate the characteristics (e.g., pitch and roll) of the autonomous drone 102. In detail, the distance, roll and pitch may be determined based on the distance between the center 130 of first image 106, where the two dotted lines meet, and the average centroid location of the first-fourth centroids 108a-108d. In some examples, when the average centroid location matches the center 130, the autonomous drone 102 may be considered level. An increasing distance of the average centroid location from the center 130 may indicate a greater pitch and/or roll. For example, one of the axes (e.g., x-axis) may represent one of the pitch or roll, and the other of the axes (e.g., y-axis) may represent the other of the pitch or roll depending on the particular implementation and configuration. Thus, a longer distance along the x-axis from the center 130 may indicate a greater roll, and a larger distance along the y-axis from the center 130 may indicate a greater pitch.

Therefore, the computing device 112 may determine the characteristics of the autonomous drone 102. The computing device 112 may determine that the autonomous drone 102 has a pitch that is a positive value. Meaning that the autonomous drone 102 is angled upward so that movement of the autonomous drone 102 is at least partially backward.

Based on the determined characteristics (e.g., the attitude), the computing device 112 may adjust the autonomous drone 102 so that the pitch approaches zero and the autonomous drone 102 adopts a level flight pattern. The autonomous drone 102 may obtain a second image 116. The computing device 112 may generate first-fourth isothermal lines 120a-120d similar to as described above with respect to the first-fourth isothermal lines 120a-120d. The first-fourth isothermal lines 120a-120d may respectively correspond to first-fourth isothermal lines 110a-110d. The first-fourth isothermal lines 120a-120d may be positioned differently relative to the first-fourth isothermal lines 110a-110d, and first-fourth centroids 122a-122d of the first-fourth isothermal lines 120a-120d may be at substantially similar positions in the second image 116. For example, the first-fourth isothermal lines 120a-120d form shapes, and the shapes have centroids that include the first-fourth centroids 122a-122d. Thus, the average position of the first-fourth centroids 122a-122d is positioned differently than the average position of the first-fourth centroids 108a-108d.

FIG. 1B illustrates a close-up perspective 120 of the autonomous drone 102 and the imaging sensor 104. In the side view 122 of the autonomous drone 102, it is clear that the imaging sensor 104 is disposed to have an unobstructed view of the sky. In the top view 124 of the autonomous drone 102, it is clear that the imaging sensor 104 has an upward facing posture and/or is oriented to face upward.

In some examples, the machine system 114 further includes an IMU that generates IMU data. The computing device 112 may analyze the IMU data (as described above) in addition to the IR data generated by the imaging sensor 104. In such examples, the machine system 114 implements a sensor fusion algorithm that incorporates an estimated attitude (e.g., angles) generated based on the IR data, and the IMU angle (e.g., attitude such as angle) to provide a better estimation. For example, The IMU data and the estimated attitude from the IR sensor will be feed in into some sensor fusion method such as extended Kalman filter or complementary filter, or other data driven methods. The autonomous drone 102 may remain in a stable flight with the estimated angle from IR data.

It should be noted that some of the features described herein may be implemented in software, hardware and/or a combination of software and hardware. In some examples, the computing device computing device 112 and/or autonomous drone 102 includes at least one computer readable storage medium comprising a set of instructions, which when executed by the computing device 112 and/or autonomous drone 102, cause the computing device 112 and/or autonomous drone 102 to implement the above described features.

FIG. 2 shows a method 300 of characteristic identification based on IR data. The method 300 may generally be implemented as part of the characteristic identification and machine adjustment process 100 (FIGS. 1A-1B). In an embodiment, the method 300 is implemented in logic instructions (e.g., software), a non-transitory computer readable storage medium, circuitry, configurable logic, fixed-functionality hardware logic, etc., or any combination thereof.

Illustrated processing block 302 receives image data of an IR image from an image sensor. The image sensor is an IR camera in some examples. Illustrated processing block 304 filters temperature-altering objects (e.g., sun, clouds, aircraft, etc.) from the image data that may affect temperature analysis.

Illustrated processing block 318 selects and analyzes a respective temperature threshold from a plurality of thresholds that has not been analyzed in illustrated processing blocks 304, 318, 306, 316, 314, 322. That is, each temperature threshold may be individually analyzed and processed. Thus, illustrated processing blocks 304, 318, 306, 316, 314, 322 form an iterative process in which the IR image of the image data is processed multiple times based on different temperature thresholds. The outputs of the iterative process may be combined.

Illustrated processing block 306 generates a respective mask based on the respective temperature threshold. For example, during the iterative process, the IR image may go through multiple temperature thresholding and mask generation iterations based on the different temperature thresholds. In each iteration, the IR image (that is masked to remove the temperature-altering objects) is converted to a binary image based on the respective temperature threshold to mask (e.g., where the IR image is above and below the respective temperature threshold) the IR image. Portions of the IR image below the respective temperature threshold are marked with a binary value (e.g., "1") and portions of the IR image above and equal to the respective temperature threshold are marked with the other binary value (e.g., "0") to generate a masked binary image. Processing block 306 is followed by illustrated processing block 316 which includes executing an erosion followed by dilution to remove potential openings and smooth out edges of the respective mask of the masked binary image.

Illustrated processing block 314 applies canny edge detection to the masked binary image to generate an edge that is a border between the areas having values above and below the respective temperature threshold. The edge is an isothermal line. The outcome is the masked binary image with only the isothermal line (e.g., edge) marked with a first binary value (e.g., "1"), with areas outside the line(s) marked with a second binary value (e.g., "0"). Canny edge detection is a multi-stage algorithm comprising the following stages. A first stage is noise reduction. Since edge detection is susceptible to noise in the image, the first stage is noise reduction is to remove the noise in the image (e.g., with a 5×5 Gaussian filter). A second stage then includes finding an intensity gradient of the image. The Smoothened image is then filtered with a Sobel kernel in both horizontal and vertical direction to get a first derivative in horizontal direction ($G_x$) and vertical direction ($G_y$). From these two images, examples may determine edge gradient and direction for each pixel as follows in Equation 1:

$$\text{Edge\_Gradient } (G) = \sqrt{G_z^2 + G_y^2} \quad \text{Angle } (\theta) = \tan^{-1}\left(\frac{G_y}{G_z}\right) \quad \text{Equation 1}$$

The gradient direction is always perpendicular to edges. The gradient direction is rounded to one of four angles representing vertical, horizontal and two diagonal directions.

A third stage may include non-maximum suppression. After getting gradient magnitude and direction, a full scan of the image is done to remove any unwanted pixels which may not constitute the edge. For this, at every pixel, pixel is checked if it is a local maximum in its neighborhood in the direction of gradient. In short, a binary image with "thin edges" is obtained.

The IR image may repeatedly be analyzed in the iterative process based on different temperature thresholds. That is, illustrated processing block illustrated processing block 322 may execute to determine if all temperature thresholds were analyzed. If not, processing block 304 executes. Otherwise, illustrated processing block 324 combines the edges (isothermal lines) together into a single image that form ellipses, in which values outside the isothermal lines are marked with the second binary value while the isothermal lines are marked with the first binary value.

Figure 3:
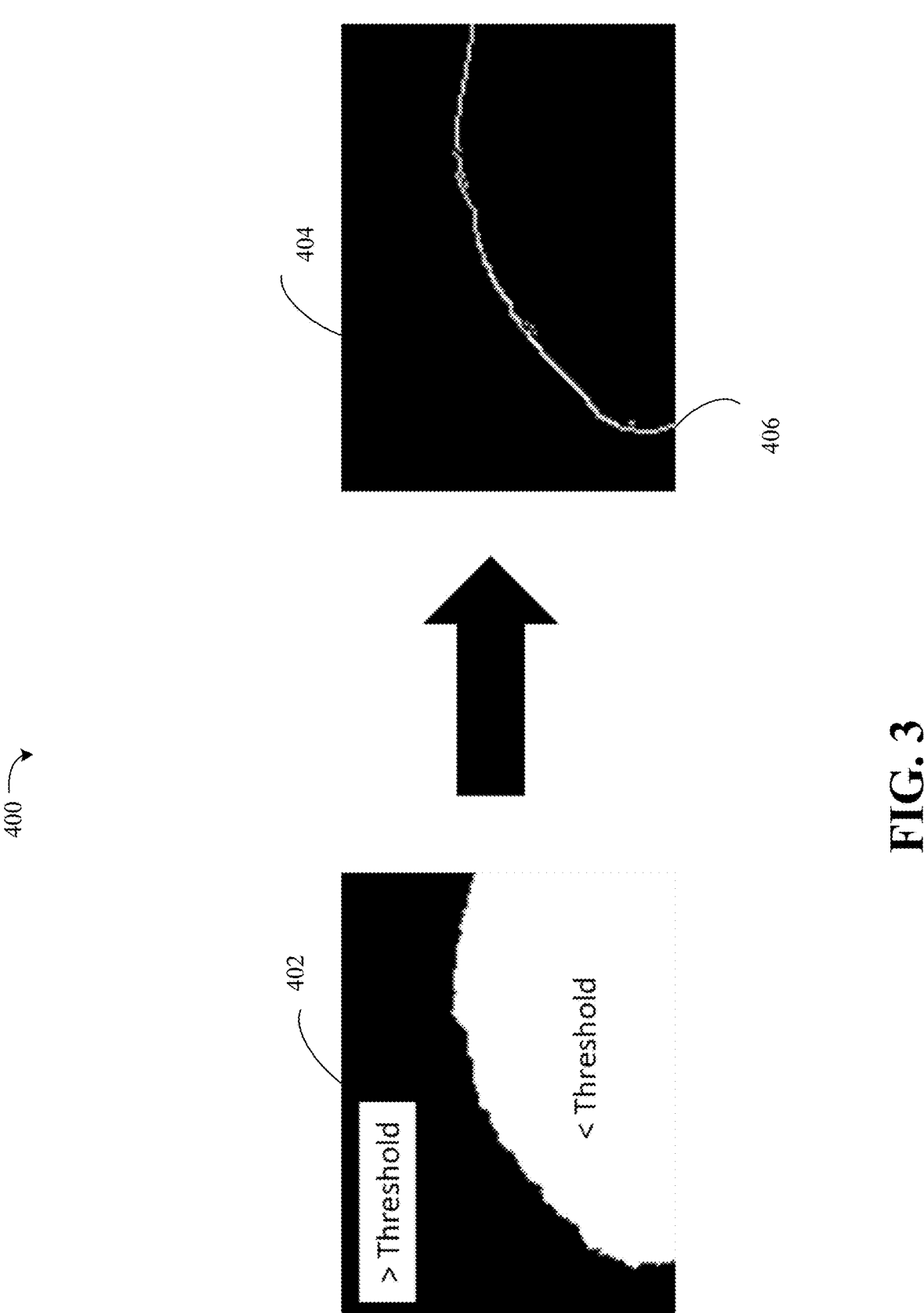
FIG. 3 shows a filtering process according to an example.

Illustrated processing 308 determines the average centroid of each ellipse. Illustrated processing block 312 determines an attitude of a vehicle from the average centroids (e.g., calculate distance from center of image to each of the average centroids). FIG. 3 illustrates a filtering process 400. The filtering process 400 may generally be implemented as part of the characteristic identification and machine adjustment process 100 (FIGS. 1A-1B) and/or the method 300 (FIG. 2).

Each original image may undergo go through multiple thresholding based on a user defined threshold. For example, the filtering process 400 may be applied multiple times based on different temperature parameters. In each iteration, the IR image is converted to a binary image 402 based on the current temperature threshold. Portions of the image having temperatures below the current temperature threshold are marked in black, and portions of the image having temperatures above the current temperature threshold are marked in white. The binary image 402 produces a clear line when using Canny Edge Detection (for example at processing block 314 of method 300) because the binary image 402 will have the maximum gradient. A very high Canny Edge threshold can be applied to remove noise in the image. Next, the binary image 402 undergoes erosion and dilution to smooth out edges that form an isothermal line. Lastly, the filtering process 400 may apply canny edge detection on the binary image 402. The outcome is an isothermal image 404 with one circular line 406 (not completely shown, but forms a circle). The filtering process 400 may be applied several times to the original image with different temperature thresholds, and the resulting circular lines 406 (which are all different from one another) are combined into a single image.

Figure 4:
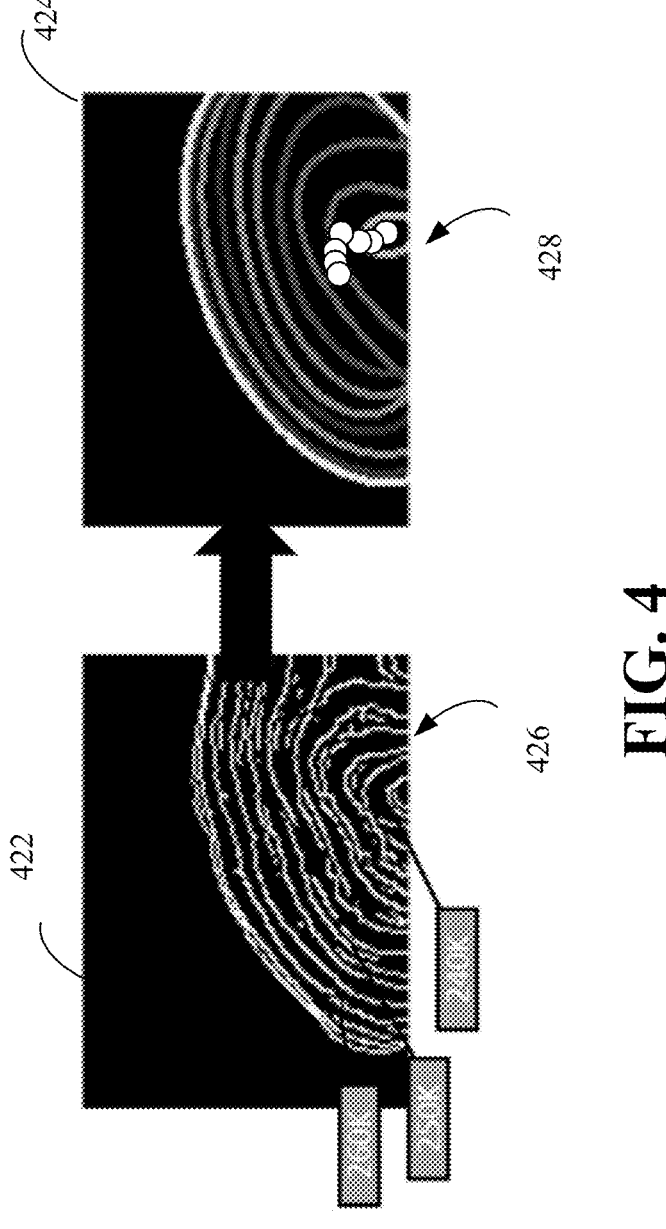
FIG. 4 shows a centroid generation process according to an example.

FIG. 4 illustrates a centroid process 420. The centroid process 420 may generally be implemented as part of the characteristic identification and machine adjustment process 100 (FIGS. 1A-1B), the method 300 (FIG. 2) and/or the filtering process 400 (FIG. 3). The filtering process 400 (FIG. 3) may be applied multiple times to an original image to generate an image 422. As illustrated, several ellipses 426 corresponding to different temperature thresholds are shown. That is, fitting an ellipse equation to each line generated during filtering process 400 obtains the equation of each ellipse 426. In centroid image 424, a centroids 428 are defined. The centroids 428 may be used to determine the roll and pitch angles by mapping.

Figure 5:
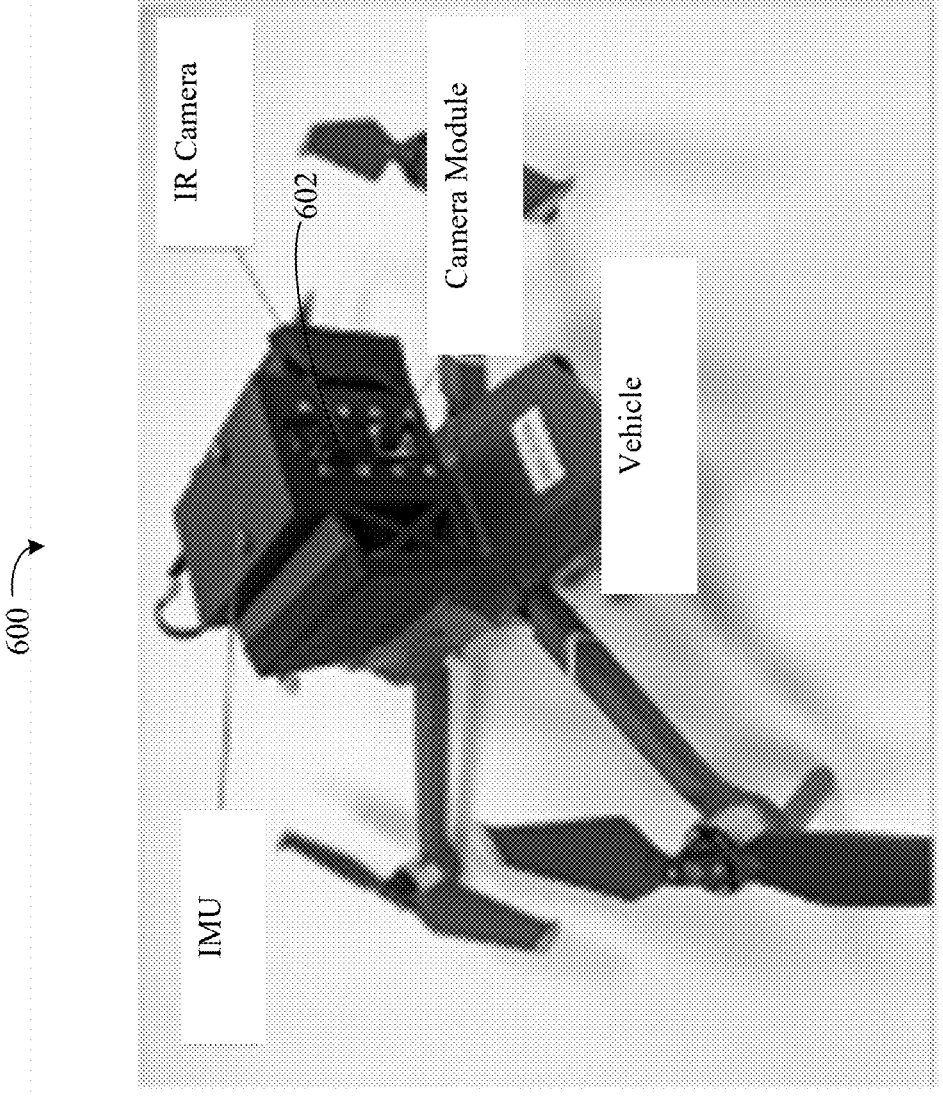
FIG. 5 illustrates a diagram of an autonomous drone according to an example.

FIG. 5 illustrates an autonomous drone 600. The autonomous drone 600 may include a sensor 602, that may be an IR camera with an upward facing posture. The autonomous drone 600 may generally be implemented as part of the characteristic identification and machine adjustment process 100 (FIGS. 1A-1B), the method 300 (FIG. 2), the filtering process 400 (FIG. 3) and/or centroid process 420 (FIG. 4).

Figure 6:
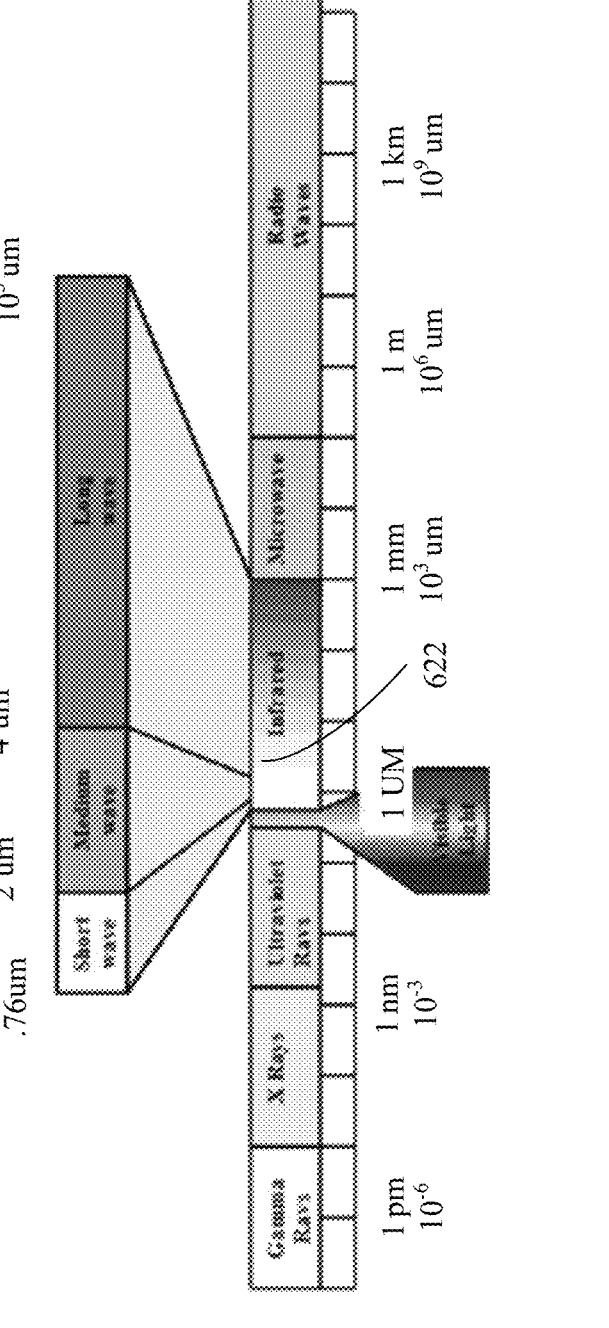
FIG. 6 illustrates different an electromagnetic spectrum according to an example.

FIG. 6 illustrates electromagnetic spectrum 620. The IR 622 may be measured in examples herein and used to determine characteristics of a vehicle. The IR 622 may be captured by imaging sensors and utilized herein, as described in the characteristic identification and machine adjustment process 100 (FIGS. 1A-1B), the method 300 (FIG. 2), the filtering process 400 (FIG. 3), centroid process 420 (FIG. 4) and/or autonomous drone 600 (FIG. 5). That is, analyzing the IR 622 provides several enhancements. For example, regardless of lighting condition, the sky naturally shows a temperature gradient which temperature gradually decreases as altitude increases. This is caused by a higher black body radiation from the earth surface. An IR camera may capture the longwave infrared waves from black body radiation at 8 μm to 14 μm. The module converts the wave intensity to a calibrated temperature value and later normalized to a monotone image (black and white). Some of the enhancements of an IR camera is that IR may penetrate layers of moisture such as mist, haze or fog, is visible in all lighting conditions and lacks an active light source.

Figure 7:
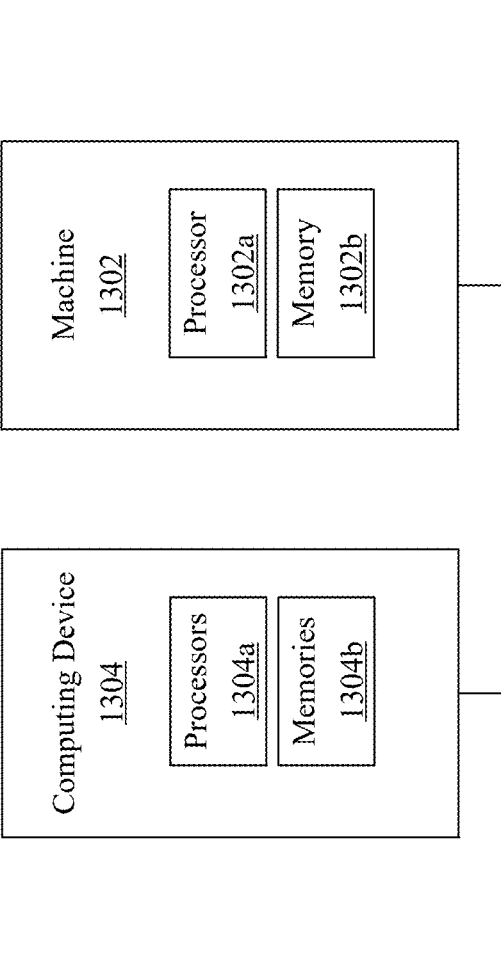
FIG. 7 shows a more detailed example of a diagram of a computing system according to an example.

FIG. 7 shows a more detailed example of a computing system 1300 to implement aspects as described herein. The computing system 1300 may generally be implemented as part of the characteristic identification and machine adjustment process 100 (FIGS. 1A-1B), the method 300 (FIG. 2), the filtering process 400 (FIG. 3), centroid process 420 (FIG. 4), autonomous drone 600 (FIG. 5) and/or IR 622 (FIG. 6).

In the illustrated example, a machine 1302 includes a processor 1302a (e.g., embedded controller, central processing unit/CPU) and a memory 1302b (e.g., non-volatile memory/NVM and/or volatile memory) containing a set of instructions, which when executed by the processor 1302a, cause the machine 1302 to implement any of the aspects described herein. For example, the machine 1302 may obtain an image from an IR sensor and provide the image to the computing device 1304, or process the image similarly to as described above. For example, the machine 1302 may obtain, from an imaging sensor, an image, determine isothermal lines on the image, and determine a characteristic of a vehicle based on the isothermal lines. The machine 1302 may be the vehicle, and the machine 1302 may adjust the attitude by adjusting an operating parameter of a vehicle.

In the illustrated example, the computing device 1304 includes processors 1304*a* (e.g., embedded controller, central processing unit/CPU) and memories 1304*b* (e.g., nonvolatile memory/NVM and/or volatile memory) containing a set of instructions, which when executed by the processor 1304*a*, cause the computing device 1304 to implement any of the aspects described herein. For example, the computing device 1304 may, instead of the machine 1302, determine isothermal lines on the image, and determine a characteristic of a vehicle based on the isothermal lines.

Figure 8:
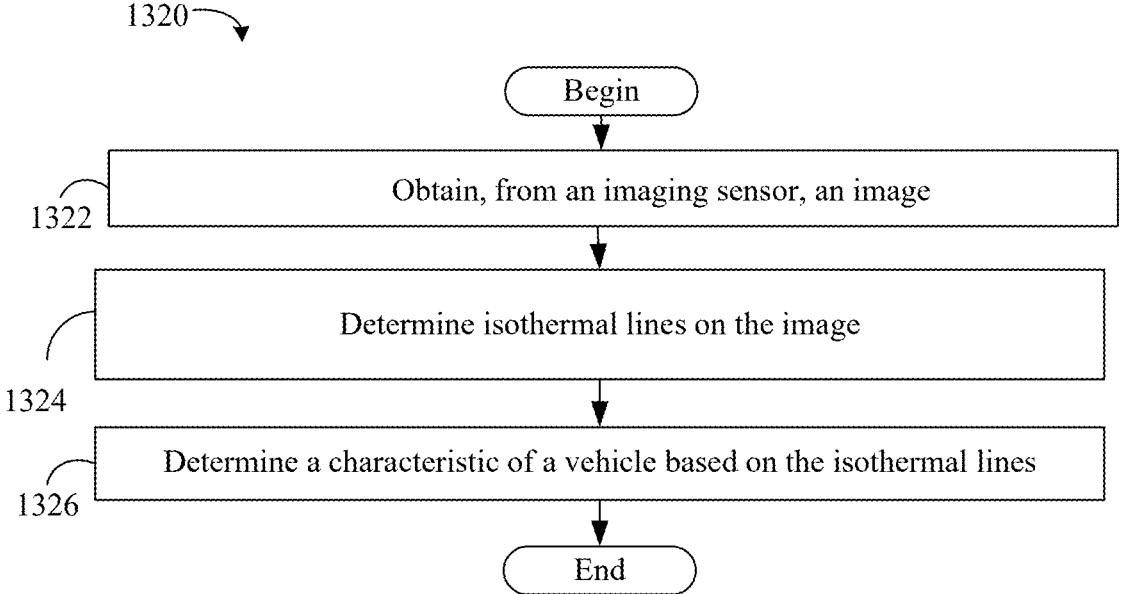
FIG. 8 shows a method of identifying characteristics of a machine according to an example.

FIG. 8 shows a method 1320 of identifying characteristics of a machine. The method 1320 may generally be implemented as part of the characteristic identification and machine adjustment process 100 (FIGS. 1A-1B), the method 300 (FIG. 2), the filtering process 400 (FIG. 3), centroid process 420 (FIG. 4), autonomous drone 600 (FIG. 5), IR 622 (FIG. 6) and/or computing system 1300 (FIG. 7). In an embodiment, the method 1320 is implemented in logic instructions (e.g., software), a non-transitory computer readable storage medium, circuitry, configurable logic, fixed-functionality hardware logic, etc., or any combination thereof.

Illustrated processing block 1322 obtains, from an imaging sensor, an image. Illustrated processing block 1324 determines isothermal lines on the image. Illustrated processing block 1326 determines a characteristic of a vehicle based on centroids of the isothermal lines. In some examples, the isothermal lines each form an ellipse, and the method 1320 masks a temperature-altering object in the image. In some examples, the method 1320 determines the characteristic based on the average centroid location. In some examples, the isothermal lines correspond to different temperatures. In some examples, the characteristic includes an attitude of the vehicle. In some examples the method 1320 includes adjusting the attitude by adjusting an operating parameter of the vehicle. In some examples, the imaging sensor is an infrared sensor and has an upward facing posture on the vehicle, and the vehicle is an aircraft.

The term "coupled" can be used herein to refer to any type of relationship, direct or indirect, between the components in question, and can apply to electrical, mechanical, fluid, optical, electromagnetic, electromechanical or other connections. In addition, the terms "first", "second", etc. can be used herein only to facilitate discussion, and carry no particular temporal or chronological significance unless otherwise indicated.

Those skilled in the art will appreciate from the foregoing description that the broad techniques of the embodiments of the present disclosure can be implemented in a variety of forms. Therefore, while the embodiments of this disclosure have been described in connection with particular examples thereof, the true scope of the embodiments of the disclosure should not be so limited since other modifications will become apparent to the skilled practitioner upon a study of the drawings, specification, and following claims.

We claim:

1. A control system comprising:

a processor; and a memory having a set of instructions, which when executed by the processor, cause the control system to:

obtain, from an imaging sensor, an image;

determine isothermal lines on the image;

determine a characteristic of a vehicle based on centroids of the isothermal lines;

mask at least one temperature-altering object that alters temperatures in the image, wherein the masking operation affects the determining of the isothermal lines on the image; and adjust the characteristic by adjusting an operating parameter of the vehicle, wherein the isothermal lines each form an ellipse.

2. The control system of claim 1, wherein the isothermal lines each form an ellipse, wherein the instructions of the memory, when executed, cause the control system to:

determine an average centroid location of the centroids.

3. The control system of claim 2, wherein the instructions of the memory, when executed, cause the control system to:

determine the characteristic based on the average centroid location.

4. The control system of claim 1, wherein the isothermal lines correspond to different temperatures.

5. The control system of claim 1, wherein the characteristic includes an attitude of the vehicle.

6. The control system of claim 1, wherein:

the imaging sensor is an infrared sensor and has an upward facing posture on the vehicle, and the vehicle is an aircraft.

7. At least one computer readable storage medium comprising a set of instructions, which when executed by a computing device, cause the computing device to:

obtain, from an imaging sensor, an image;

determine isothermal lines on the image;

determine a characteristic of a vehicle based on centroids of the isothermal lines;

mask at least one temperature-altering object that alters temperatures in the image, wherein the masking operation affects the determining of the isothermal lines on the image; and adjust the characteristic by adjusting an operating parameter of the vehicle, wherein the isothermal lines each form an ellipse.

8. The at least one computer readable storage medium of claim 7, wherein the isothermal lines each form an ellipse, wherein the instructions, when executed, cause the computing device to:

determine an average centroid location of the centroids.

9. The at least one computer readable storage medium of claim 8, wherein the instructions, when executed, cause the computing device to:

determine the characteristic based on the average centroid location.

10. The at least one computer readable storage medium of claim 7, wherein the isothermal lines correspond to different temperatures.

11. The at least one computer readable storage medium of claim 7, wherein the characteristic includes an attitude of the vehicle.

12. The at least one computer readable storage medium of claim 7, wherein:

the imaging sensor is an infrared sensor and has an upward facing posture on the vehicle, and the vehicle is an aircraft.

13. A machine comprising:

an imaging sensor that obtains an image;

a processor; and a memory having a set of instructions, which when executed by the processor, cause the machine to:

determine isothermal lines on the image;

determine a characteristic of the machine based on centroids of the isothermal lines;

mask at least one temperature-altering object that alters temperatures in the image, wherein the masking operation affects the determining of the isothermal lines on the image; and adjust the characteristic by adjusting an operating parameter of the vehicle, wherein the isothermal lines each form an ellipse.

14. The machine of claim 13, wherein the isothermal lines each form an ellipse, wherein the instructions, which when executed by the processor, cause the machine to:

determine an average centroid location of the centroids.

15. The machine of claim 14, wherein the instructions, which when executed by the processor, cause the machine to:

determine the characteristic based on the average centroid location.

16. The machine of claim 13 wherein:

the isothermal lines correspond to different temperatures, and the characteristic includes an attitude of the machine.

17. The machine of claim 13, wherein:

the imaging sensor is an infrared sensor and has an upward facing posture on the machine, and the machine is an aircraft.

* * * * *